US012040713B2

(12) United States Patent
Bae et al.

(10) Patent No.: US 12,040,713 B2
(45) Date of Patent: Jul. 16, 2024

(54) DC-DC CONVERTER OF POWER CONVERSION SYSTEM

(71) Applicant: LS ELECTRIC CO., LTD., Anyang-si (KR)

(72) Inventors: Sun Ho Bae, Anyang-si (KR); Jae Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 207 days.

(21) Appl. No.: 17/627,056

(22) PCT Filed: Mar. 16, 2020

(86) PCT No.: PCT/KR2020/003602
§ 371 (c)(1),
(2) Date: Jan. 13, 2022

(87) PCT Pub. No.: WO2021/010570
PCT Pub. Date: Jan. 21, 2021

(65) Prior Publication Data
US 2022/0376624 A1 Nov. 24, 2022

(30) Foreign Application Priority Data
Jul. 18, 2019 (KR) .................. 10-2019-0087131

(51) Int. Cl.
*H02M 3/158* (2006.01)
(52) U.S. Cl.
CPC ....... *H02M 3/1582* (2013.01); *H02M 3/1584* (2013.01)
(58) Field of Classification Search
CPC ... H02M 3/1582; H02M 1/0092; H02M 7/483
See application file for complete search history.

(56) References Cited

U.S. PATENT DOCUMENTS

| 10,020,747 B2 | 7/2018 | Madsen |
| 2009/0085537 A1 | 4/2009 | Nakabayashi et al. |

(Continued)

FOREIGN PATENT DOCUMENTS

| DE | 2842262 A1 | 4/1979 |
| DE | 102014203157 A | 8/2015 |

(Continued)

OTHER PUBLICATIONS

International Search Report for related International Application No. PCT/KR2020/003602; report dated Jan. 21, 2021; (5 pages).

(Continued)

*Primary Examiner* — Alex Torres-Rivera
(74) *Attorney, Agent, or Firm* — K&L Gates LLP (57) ABSTRACT

Disclosed is a DC-DC converter of a power conversion system comprising first to fourth switches; fifth to eighth switches; a first capacitor connected to the first and second switches; a second capacitor connected to the fifth and sixth switches; a third capacitor connected to the third and fourth switches; a fourth capacitor connected to the seventh and eighth switches; a first inductor connected to a first node between the first and second switches, and a second node between the fifth and sixth switches; and a second inductor connected to a third node between the third and fourth switches, and a fourth node between the seventh and eighth switches, wherein the first and second inductors are coupled inductors, and a fifth node between the second and third switches, and a sixth node between the sixth and seventh switches are electrically equivalent.

5 Claims, 9 Drawing Sheets

(56) References Cited

U.S. PATENT DOCUMENTS

| | | | |
|---|---|---|---|
| 2010/0007319 A1* | 1/2010 | Manabe | H02M 3/1582 |
| | | | 323/285 |
| 2012/0068537 A1 | 3/2012 | Hintz et al. | |
| 2016/0172976 A1 | 6/2016 | Mu et al. | |
| 2016/0329811 A1* | 11/2016 | Du | H02M 1/14 |
| 2016/0344297 A1 | 11/2016 | Lee | |
| 2018/0026540 A1 | 1/2018 | Chen et al. | |
| 2018/0219479 A1 | 8/2018 | Kaiser et al. | |
| 2018/0331625 A1 | 11/2018 | Somani et al. | |
| 2018/0337602 A1* | 11/2018 | Zhou | H02M 3/1582 |
| 2019/0190259 A1 | 6/2019 | Ludwig et al. | |
| 2020/0067412 A1* | 2/2020 | Dilley | H02M 3/1582 |

FOREIGN PATENT DOCUMENTS

| | | |
|---|---|---|
| JP | 2014090662 A | 5/2014 |
| JP | 2015139312 A | 7/2015 |
| JP | 2018038240 A | 3/2018 |
| KR | 101817903 B1 | 1/2018 |
| KR | 101936230 B1 | 1/2019 |
| WO | 2007110954 A1 | 10/2007 |
| WO | 2017195511 A1 | 11/2017 |

OTHER PUBLICATIONS

Written Opinion for related International Application No. PCT/KR2020/003602; report dated Jan. 21, 2021; (5 pages).
Supplementary European Search Report for related European Application No. 20841158.7; action dated Jul. 11, 2023; (10 pages).
Office Action for related Chinese Application No. 202080051964.2; action dated Oct. 13, 2023; (8 pages).
Office Action for related Japanese Application No. 2022-502604; action dated Jan. 24, 2023; (2 pages).
Notice of Allowance for related Chinese Application No. 202080051964.2; action dated Feb. 8, 2024; (7 pages).

* cited by examiner

DC-DC CONVERTER OF POWER CONVERSION SYSTEM

CROSS-REFERENCE TO RELATED APPLICATION

The present application is a National Stage of International Application No. PCT/KR2020/003602 filed on Mar. 16, 2020, which claims priority to and the benefit of Korean Patent Application No. 10-2019-0087131, filed on Jul. 18, 2019, the disclosure of which is incorporated herein by reference in its entirety.

FIELD

The present disclosure relates to a DC-DC converter of a power conversion system.

BACKGROUND

A power conversion system converts direct current (DC) power into power suitable for application to another load. For example, an electric vehicle may supply electric power to an electric motor by using electric energy stored in an energy storage device (battery).

Such a power conversion system may include a bidirectional DC-DC converter. The bidirectional DC-DC converter can convert the voltage between an energy storage device and an inverter. The inverter supplies power to the electric motor or receives power from the electric motor by regenerative braking. In this case, the bidirectional DC-DC converter supplies power to the electric motor by adjusting the voltage from the energy storage device to the inverter, or charges the energy storage device by adjusting the voltage from the inverter.

Recently, DC voltages used in solar power generation or energy storage devices are gradually increasing, and countermeasures for system protection including energy storage devices are required in the event of an accident.

However, in the case of the conventional DC-DC converter, there is a problem in that the input/output voltage range is low or it is impossible to block when a DC short circuit accident occurs. Therefore, a new topology for a bidirectional DC-DC converter is required.

SUMMARY

The technical problem to be solved by the present disclosure is to provide a DC-DC converter that can efficiently block when a DC short-circuit accident occurs while responding to a wide input/output voltage.

A DC-DC converter according to an embodiment of the present disclosure may include: first to fourth switches connected in series; fifth to eighth switches connected in series; a first capacitor connected in parallel to the series connection of the first and second switches; a second capacitor connected in parallel to the series connection of the fifth and sixth switches; a third capacitor connected in parallel to the series connection of the third and fourth switches; a fourth capacitor connected in parallel to the series connection of the seventh and eighth switches; a first inductor electrically connected to a first node between the first and second switches, and a second node between the fifth and sixth switches; and a second inductor electrically connected to a third node between the third and fourth switches, and a fourth node between the seventh and eighth switches, wherein the first and second inductors may constitute a coupled inductor, and a fifth node between the second and third switches and a sixth node between the sixth and seventh switches may be electrically equivalent.

In an embodiment of the present disclosure, the fifth node between the second and third switches and the sixth node between the sixth and seventh switches may be electrically equivalent.

In an embodiment of the present disclosure, the first and second switches, the third and fourth switches, the fifth and sixth switches, and the seventh and eighth switches may operate complementary to each other, respectively.

In an embodiment of the present disclosure, the fifth and eighth switches may be on, the sixth and seventh switches may be off, and an output voltage may become smaller than an input voltage by on/off operations of the first and fourth switches.

In an embodiment of the present disclosure, the first and fourth switches may be on, the second and third switches may be off, and an output voltage may become greater than an input voltage by on/off operations of the sixth and seventh switches.

The DC-DC converter of the present disclosure may further include: ninth to twelfth switches connected in series; 13th to 16th switches connected in series; 17th to 20th switches connected in series; 21st to 24th switches connected in series; a third inductor electrically connected to a seventh node between the ninth and tenth switches and an eighth node between the 13th and 14th switches; a fourth inductor electrically connected to a ninth node between the eleventh and twelfth switches and a tenth node between the 15th and 16th switches; a fifth inductor electrically connected to an eleventh node between the 17th and 18th switches and a twelfth node between the 21st and 22nd switches; and a sixth inductor electrically connected to a 13th node between the 19th and 20th switches and a 14th node between the 23rd and 24th switches, wherein the third and fourth inductors may constitute a second coupled inductor, and the fifth and sixth inductors may constitute a third coupled inductor.

In an embodiment of the present disclosure, the fifth node, the sixth node, a 15th node between the tenth and eleventh switches, a 16th node between the 14th and 15th switches, a 17th node between the 18th and 19th switches, and an 18th node between the 22nd and 23rd switches may be electrically equivalent.

In an embodiment of the present disclosure, the DC-DC converter may be configured to be modularized, and at least two or more of the DC-DC converters may be configured to be connected in parallel.

In addition, the DC-DC converter according to an embodiment of the present disclosure may include: an upper converter; and a lower converter connected in series to the upper converter, wherein the upper converter may include first and second switches connected in series; third and fourth switches connected in series; a first inductor electrically connected to a first node between the first and second switches and a second node between the third and fourth switches; a first storage connected in parallel to the series connection of the first and second switches; and a second storage connected in parallel to the series connection of the third and fourth switches; and the lower converter may include fifth and sixth switches connected in series; seventh and eighth switches connected in series; a second inductor electrically connected to a third node between the fifth and sixth switches and a fourth node between the seventh and eighth switches; a third storage connected in parallel to the series connection of the fifth and sixth switches; and a fourth storage connected in parallel to the series connection of the seventh and eighth switches; wherein the first and second inductors may constitute a coupled inductor, the second switch and the fifth switch may be connected in series, and the fourth switch and the sixth switch may be connected in series.

In an embodiment of the present disclosure, the first and second switches, the third and fourth switches, the fifth and sixth switches, and the seventh and eighth switches may operate complementary to each other, respectively.

In an embodiment of the present disclosure, the third and eighth switches may be on, the fourth and seventh switches may be off, and an output voltage may become smaller than an input voltage by on/off operations of the first and sixth switches.

In an embodiment of the present disclosure, the first and sixth switches may be on, the second and fifth switches may be off, and an output voltage may become greater than an input voltage by on/off operations of the fourth and seventh switches.

According to the present disclosure as described above, since the switches are connected in series, it is possible to use a high input/output voltage based on a low-voltage switching element.

In addition, according to the present disclosure, the volume of the inductor can be reduced and loss can be reduced by the coupled inductor.

In addition, according to the present disclosure, it is possible to efficiently respond to a DC short circuit accident.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION

Hereinafter, in order to fully understand the configuration and effects of the present disclosure, preferred embodiments of the present disclosure will be described with reference to the accompanying drawings. However, the present disclosure is not limited to the embodiments disclosed below, and may be embodied in various forms and various modifications may be made. Rather, the description of the present disclosure is provided so that this disclosure will be thorough and complete and will fully convey the concept of the disclosure to those of ordinary skill in the art. In the accompanying drawings, the size of the elements is enlarged compared to actual ones for the convenience of description, and the ratio of each element may be exaggerated or reduced.

Terms such as 'first' and 'second' may be used to describe various elements, but, the above elements should not be limited by the terms above. The above terms may be used only for the purpose of distinguishing one element from another. For example, without departing from the scope of the present disclosure, a 'first element' may be named a 'second element' and similarly, a 'second element' may also be named a 'first element.' In addition, expressions in the singular include plural expressions unless explicitly expressed otherwise in the context. Unless otherwise defined, terms used in the embodiments of the present disclosure may be interpreted as meanings commonly known to those of ordinary skill in the art.

Hereinafter, a DC-DC converter of a power conversion system of an embodiment of the present disclosure will be described with reference to the drawings.

Figure 1:
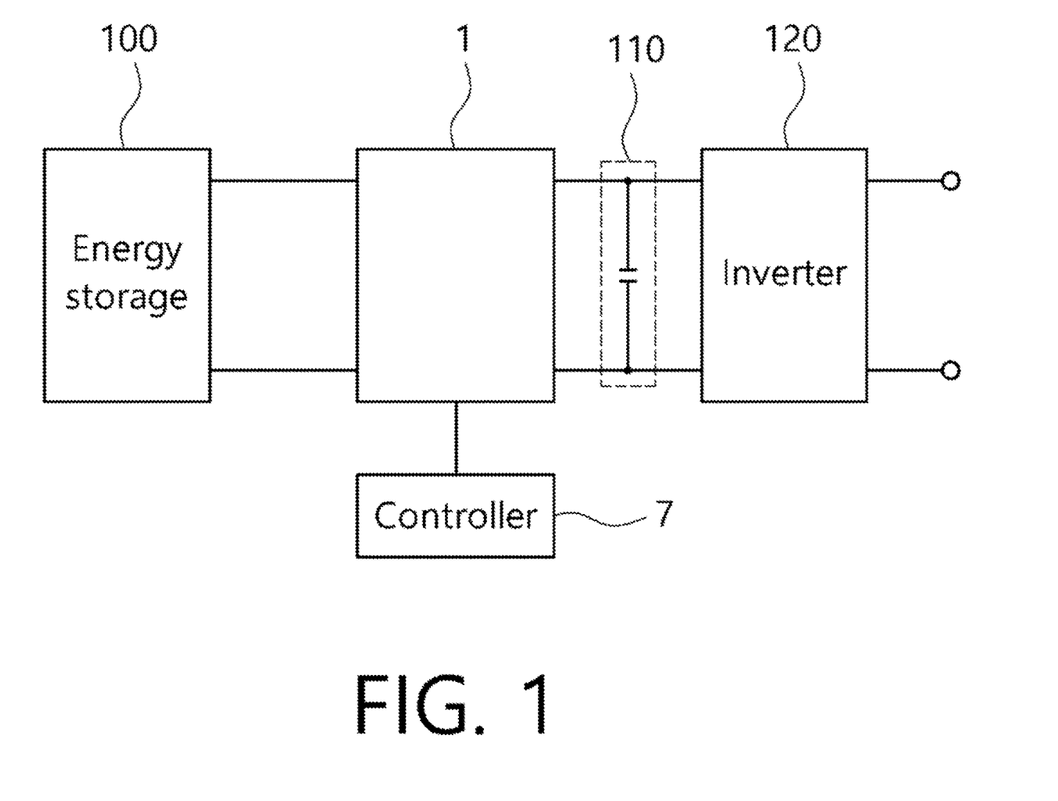
FIG. 1 is a configuration diagram for explaining an example of a power conversion system to which an exemplary embodiment of the present disclosure is applied.

FIG. 1 is a configuration diagram for explaining an example of a power conversion system to which an exemplary embodiment of the present disclosure is applied.

As shown in the drawing, a system to which an embodiment of the present disclosure is applied may include an energy storage 100, a DC-DC converter 1, a DC link unit 110, and an inverter 120.

In the system of FIG. 1, the DC voltage stored in the energy storage 100 may be stepped up or stepped down by the DC-DC converter 1 of an embodiment of the present disclosure and provided to the DC link unit 110, and the DC voltage stored in the DC link unit 110 may be converted into an alternating current (AC) voltage by the inverter 120 and transmitted to a load.

As such, the DC-DC converter 1 according to an embodiment of the present disclosure may convert the magnitude of the DC voltage stored in the energy storage 100 and provide it to the DC link unit 110.

In this case, a controller 7 may control a plurality of switches of the DC-DC converter 1, respectively, to convert an input DC voltage to output a DC voltage.

Figure 2:
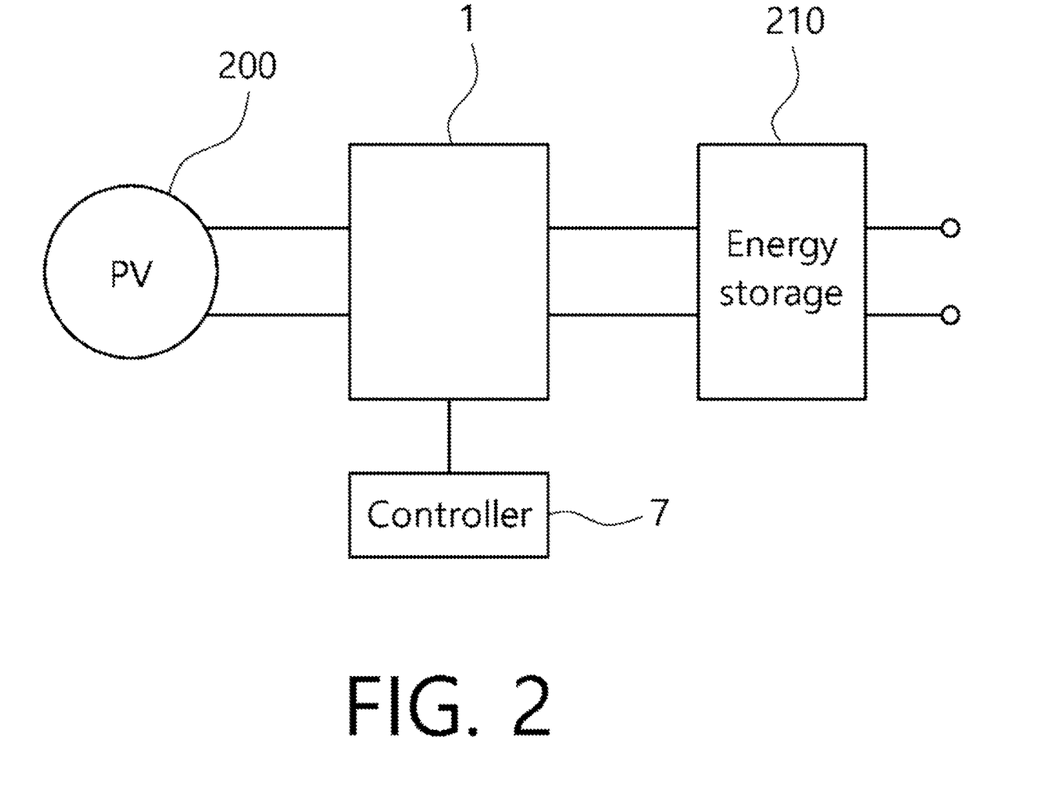
FIG. 2 is a configuration diagram for explaining another example of a power conversion system to which an exemplary embodiment of the present disclosure is applied.

FIG. 2 is a configuration diagram for explaining another example of a power conversion system to which an exemplary embodiment of the present disclosure is applied.

As shown in this figure, a system to which an embodiment of the present disclosure is applied may include a photovoltaic unit (PV) 200, a DC-DC converter 1, and an energy storage 210.

In an embodiment of the present disclosure, the DC-DC converter 1 may convert the DC voltage produced by the PV 200 and provide it for the energy storage 210 to store.

In this case, a controller 7 may control a plurality of switches of the DC-DC converter 1, respectively, to convert an input DC voltage to output a DC voltage.

However, the DC-DC converter 1 of the present disclosure is not limited to the above-mentioned system, and may be applied to a system in which the magnitude of the DC voltage is variously converted and provided.

Hereinafter, after a conventional DC-DC converter topology is described, a DC-DC converter according to an embodiment of the present disclosure will be described.

Figure 3A:
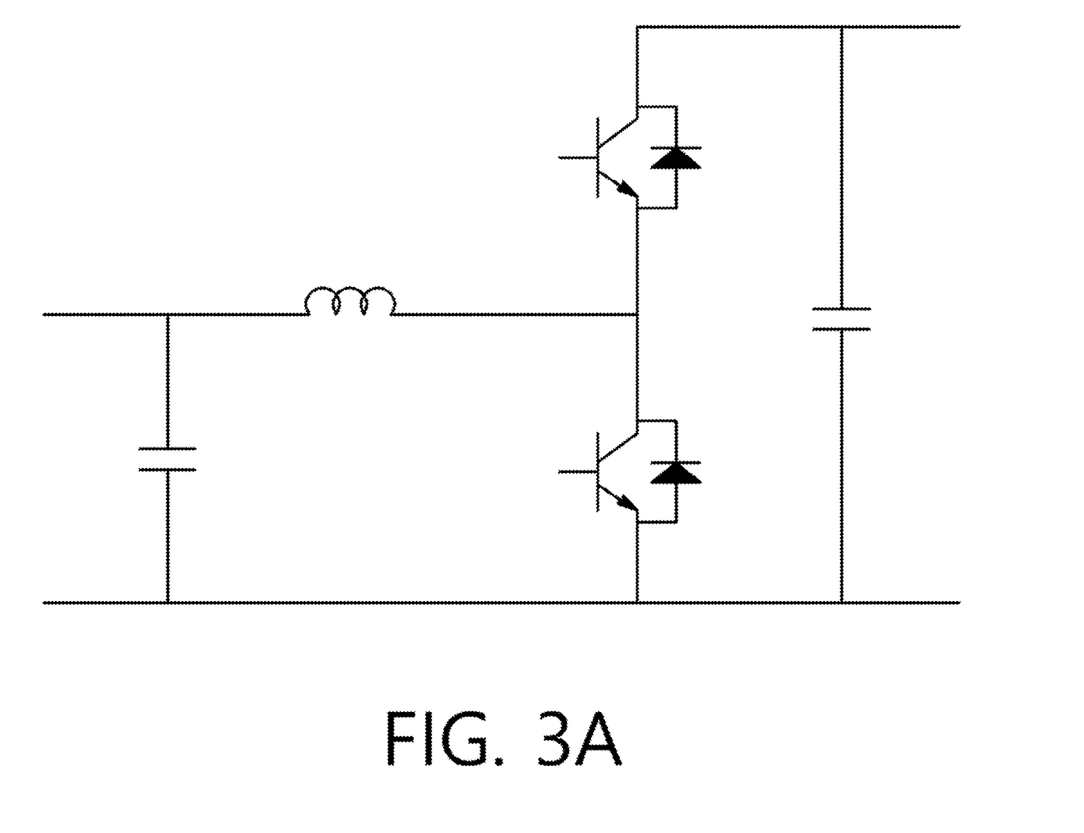
FIGS. 3a to 3c are circuit configuration diagrams for explaining a conventional DC-DC converter topology.
Figure 3B:
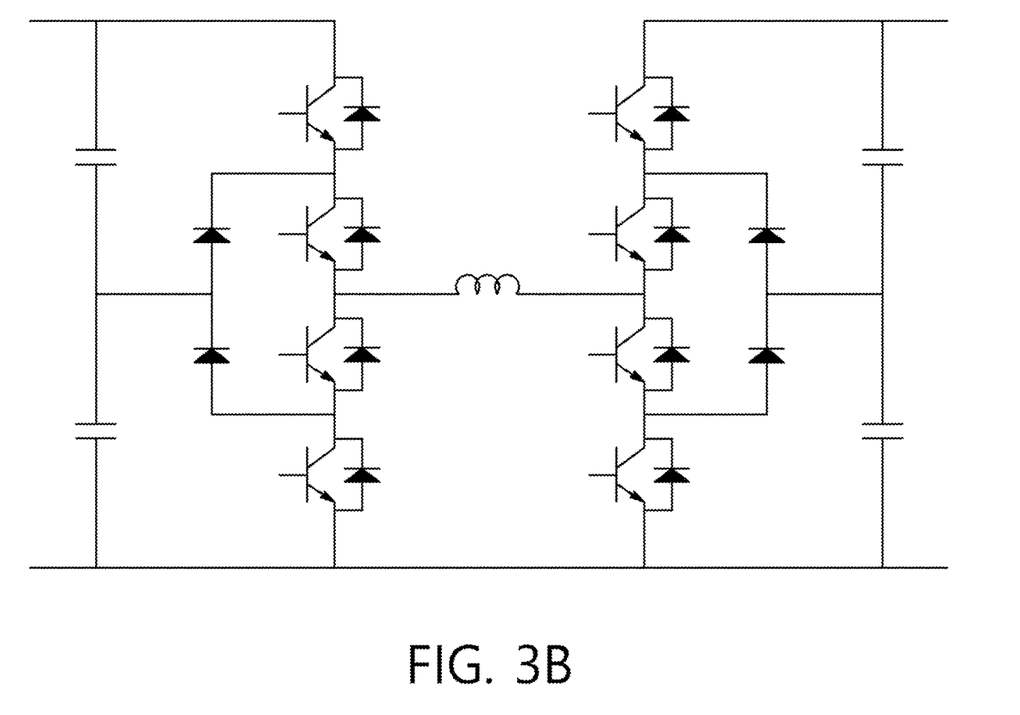
Figure 3C:
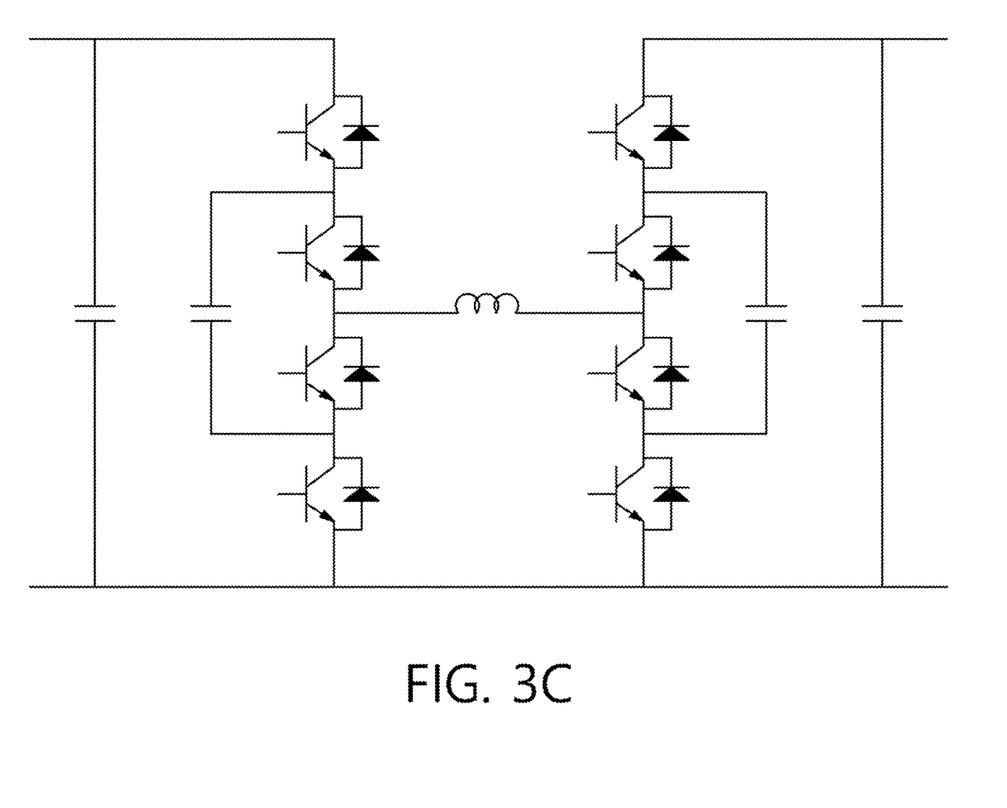

FIGS. 3a to 3c are circuit configuration diagrams for explaining a conventional DC-DC converter topology.

FIG. 3a shows a conventionally basically used two-level boost topology, and when the input voltage is 650V, the output voltage becomes 650V or less, and a switching element of 2000V is required to output a voltage of 1500V. In addition, there is a problem in that it is impossible to block when a DC short circuit accident occurs.

FIG. 3b shows a neutral-point-clamped (NPC) topology, and when the input voltage is 650V, the output voltage is in the range of 400 to 1500V, and a switching element of 1200V is required to output a voltage of 1500V. According to the topology of FIG. 3b, it is possible to block when a DC short circuit accident occurs, but there is a problem in that capacitor voltage balancing is impossible.

FIG. 3c shows a flying capacitor topology, and when the input voltage is 650V, the output voltage is in the range of 400 to 1500V, and a switching element of 1200V is required to output a voltage of 1500V. According to the topology of FIG. 3c, it is possible to block when a DC short circuit accident occurs, but there are problems in that the frequency of the inductor is doubled, the size of the flying capacitor is increased, and the size of the converter itself is also increased, and a capacitor initial charging circuit is required and control for voltage maintenance is required.

Figure 4:
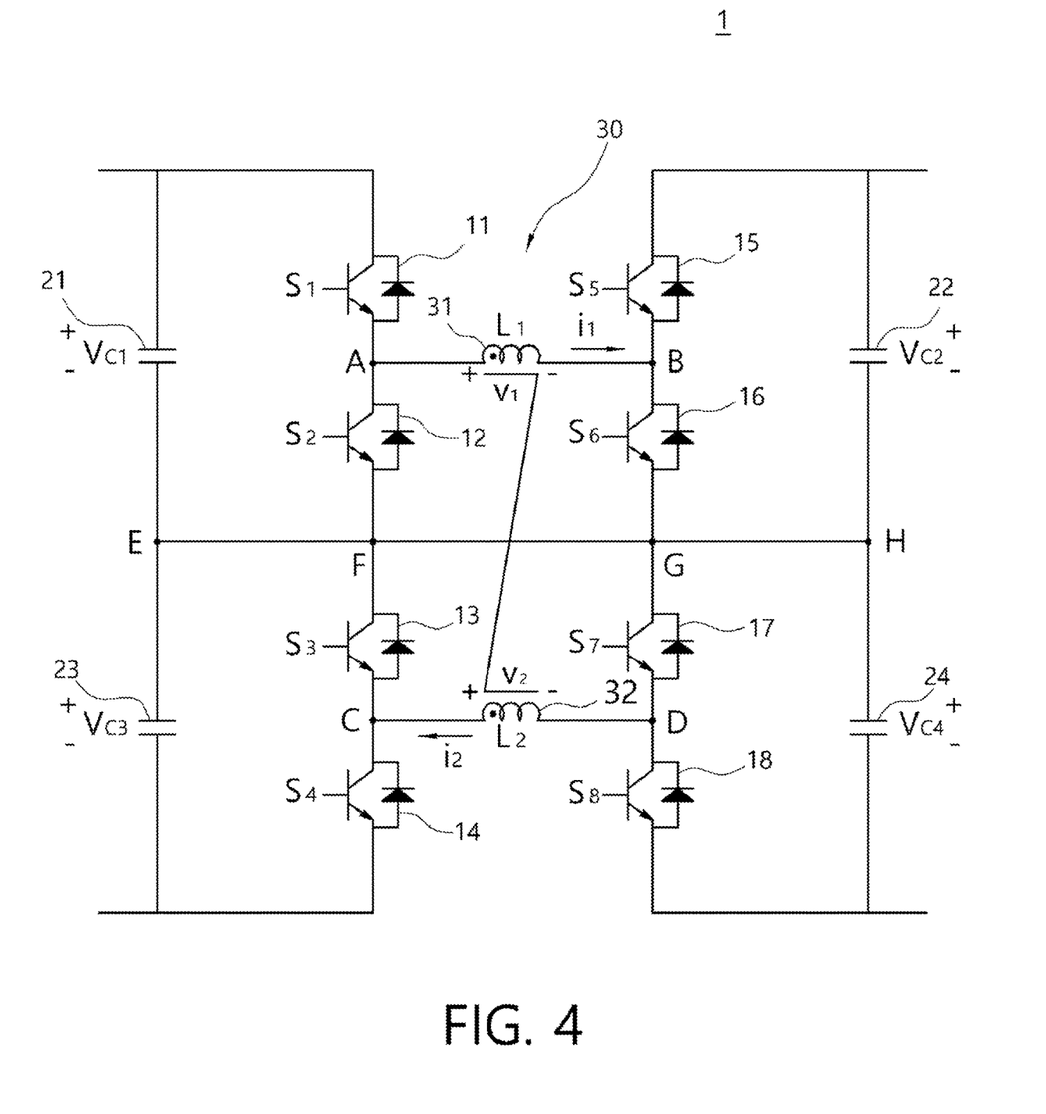
FIG. 4 is a circuit configuration diagram for explaining the topology of a DC-DC converter according to an exemplary embodiment of the present disclosure.

FIG. 4 is a circuit configuration diagram for explaining a DC-DC converter according to an exemplary embodiment of the present disclosure.

As shown in this figure, The DC-DC converter 1 of an embodiment of the present disclosure may include first to fourth switches 11 to 14 sequentially connected in series, and fifth to eighth switches 15 to 18 sequentially connected in series. Each of the first to eighth switches 11 to 18 may be, for example, an insulated gate bipolar transistor (IGBT), but the present disclosure is not limited thereto, and various types of semiconductor switching elements may be used.

The first switch 11 and the second switch 12 may operate complementarily by the control of the controller 7. "Operate complementarily" means that when the first switch 11 is on, the second switch 12 is off, and when the first switch 11 is off, the second switch 12 is on. Similarly, the third switch 13 and the fourth switch 14 may operate complementarily, and the fifth switch 15 and the sixth switch 16 may operate complementarily. In addition, the seventh switch 17 and the eighth switch 18 may operate complementarily.

The series connection of the first to fourth switches 11 to 14 and the series connection of the first capacitor 21 and the third capacitor 23 may be connected in parallel. In this case, a node F between the second switch 12 and the third switch 13 and a node E between the first capacitor 21 and the third capacitor 23 may be electrically equivalent. That is, the series connection of the first and second switches 11 and 12 and the first capacitor 21 may be connected in parallel, and the series connection of the third and fourth switches 13 and 14 and the third capacitor 23 may be connected in parallel.

In addition, the series connection of the fifth to eighth switches 15 to 18 and the series connection of the second capacitor 22 and the fourth capacitor 24 may be connected in parallel. In this case, a node G between the sixth switch 16 and the seventh switch 17 and a node H between the second capacitor 22 and the fourth capacitor 24 may be electrically equivalent. That is, the series connection of the fifth and sixth switches 15 and 16 and the second capacitor 22 may be connected in parallel, and the series connection of the seventh and eighth switches 17 and 18 and the fourth capacitor 24 may be connected in parallel.

A first inductor 31 may be electrically connected to a node A between the first switch 11 and the second switch 12 and a node B between the fifth switch 15 and the sixth switch 16.

In addition, a second inductor 32 may be electrically connected to a node C between the third switch 13 and the fourth switch 14 and a node D between the seventh switch 17 and the eighth switch 18.

The first and second inductors 31 and 32 may be coupled to each other to constitute a coupled inductor. That is, the turns ratio of the first and second inductors 31 and 32 may be the same, and the primary coil of the first inductor 31 and the secondary coil of the second inductor 32 may be magnetically coupled through the core.

Further, in one embodiment of the present disclosure, the node F between the second switch 12 and the third switch 13 and the node G between the sixth switch 16 and the seventh switch 17 may be electrically equivalent. Thus, the node E, the node F, the node G, and the node H may be electrically equivalent.

According to the topology configured as described above, the DC-DC converter 1 of the present disclosure may be configured as a non-insulated type, and has a structure capable of step-up and step-down in both directions.

Since the DC-DC converter 1 according to an embodiment of the present disclosure is configured by connecting switches in series, it is possible to use a high input/output voltage based on a low-voltage switching element. In addition, the volume of the inductor can be reduced and loss can be reduced by the coupled inductor. In addition, it can effectively respond to DC short circuit accidents.

In the topology as shown in FIG. 4, when the DC-DC converter 1 of an embodiment of the present disclosure operates as a buck (step-down) converter, the first and fourth switches 11 and 14 may be controlled to be on or off by the control of the controller 7, the second switch 12 may operate complementary to the first switch 11, and the third switch 13 may operate complementary to the fourth switch 14. In addition, by the controller 7, the fifth switch 15 and the eighth switch 18 may be controlled to be on, and the sixth switch 16 and the seventh switch 17 may be controlled to be off.

In addition, when the DC-DC converter 1 of an embodiment of the present disclosure operates as a boost (step-up) converter, the sixth and seventh switches 16 and 17 may be controlled to be on or off by the control of the controller 7, the fifth switch 15 may operate complementary to the sixth switch 16, and the eighth switch 18 may operate complementary to the seventh switch 17. In addition, by the controller 7, the first switch 11 and the fourth switch 14 may be controlled to be on, and the second switch 12 and the third switch 13 may be controlled to be off.

The DC-DC converter 1 according to an embodiment of the present disclosure, as shown in FIG. 4, may be configured to be modularized. According to such a configuration, these DC-DC converters 1 may be respectively connected in parallel.

By the modularized DC-DC converters 1 connected in parallel, it is possible to obtain an output voltage of a desired magnitude.

Figure 5:
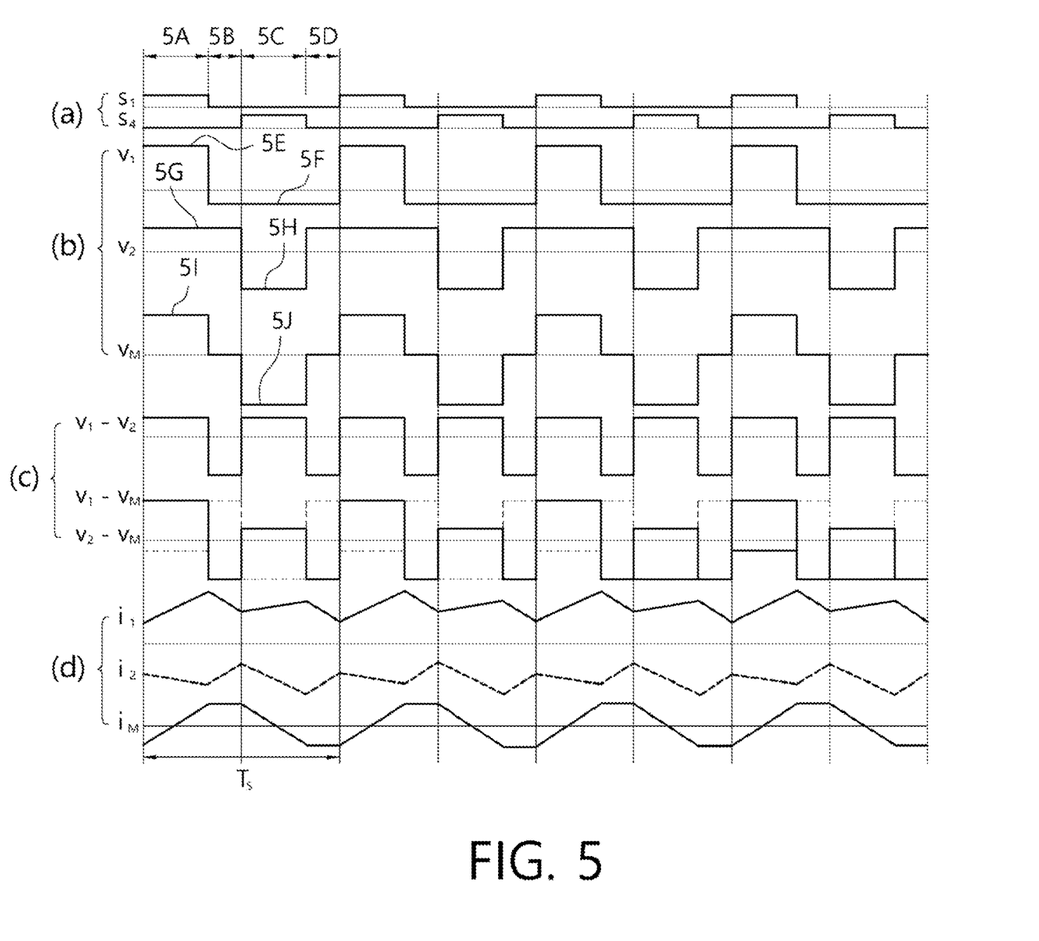
FIG. 5 is an exemplary diagram for explaining the operation of a DC-DC converter according to an exemplary embodiment of the present disclosure.

FIG. 5 is an exemplary diagram for explaining the operation of a DC-DC converter according to an exemplary embodiment of the present disclosure, and shows an example in which the DC-DC converter 1 is used as a buck converter. However, in one embodiment of the present disclosure, it is described as an example that the controller 7 turns on the first switch 11 for a part 5A and turns off a part 5B (in this case, the fourth switch 14 is off) in a half cycle Ts/2, and turns on the fourth switch 14 for a part 5C and turns off a part 5D (in this case, the first switch 11 is off) in the remaining half cycle Ts/2, but may control all of them to be on or off during a half cycle (that is, during a half cycle, the first switch 11 is on, the fourth switch 14 is off, and during the other half cycle, the first switch 11 is off and the fourth switch 14 is on), and the ratio of 5A and 5B and the ratio of 5C and 5D are not limited to those shown in FIG. 5. Referring to (a) of FIG. 5, the controller 7 may control on/off of the first switch 11 and the fourth switch 14. That is, it is possible to control that the first switch 11 is on in a partial section 5A of the half cycle Ts/2, and the first switch 11 is off in the remaining section 5B. In this case, the fourth switch 14 may be controlled to be off in the corresponding half cycle. In addition, it is possible to control that the fourth switch 14 is on in a partial section 5C of the remaining half cycle, and the fourth switch 14 is off in the remaining section 5D. In this case, the first switch 11 may be controlled to be off in the remaining half cycle. Since it is a buck converter, the second switch 12 and the third switch 13 operate complementary to the first switch 11 and the fourth switch 14, respectively, and the fifth switch 15 and the eighth switch 18 are on, and the sixth switch 16 and the seventh switch 17 are off.

Accordingly, as shown in (b), in the section 5A in which the first switch 11 is on, the voltage $v_1$ may be applied to the first inductor 31 like the 5E. In this case, the magnitude 5E of the voltage $v_1$ may be a value obtained by subtracting the voltage $V_{c2}$ of the second capacitor 22 from the voltage $V_{c1}$ of the first capacitor 21. Also, in a section in which the first switch 11 is off within one cycle (a section excluding 5A), a voltage $v_1$ may be applied to the first inductor 31 like 5F. The magnitude 5F of the voltage $v_1$ may be an inverse voltage of the voltage of the second capacitor 22.

Also, in a section 5C in which the fourth switch 14 is on, the voltage $v_2$ may be applied to the second inductor 32 like 5H. In this case, the magnitude 5H of the voltage $v_2$ may be an inverse voltage of a value obtained by subtracting the voltage $V_{c4}$ of the fourth capacitor 24 from the voltage $V_{c3}$ of the third capacitor 23. Also, in a section in which the fourth switch 14 is off within one cycle (a section excluding 5C), a voltage $v_2$ may be applied to the second inductor 32 like 5G. The magnitude 5G of the voltage $v_2$ may be the voltage $V_{c4}$ of the fourth capacitor 24.

Meanwhile, a voltage $v_M$ may be applied by a mutual inductance of the coupled inductor 30. In this case, the voltage $v_M$ is a voltage that cannot be measured in reality, and is a value obtained by modeling.

Figure 6:
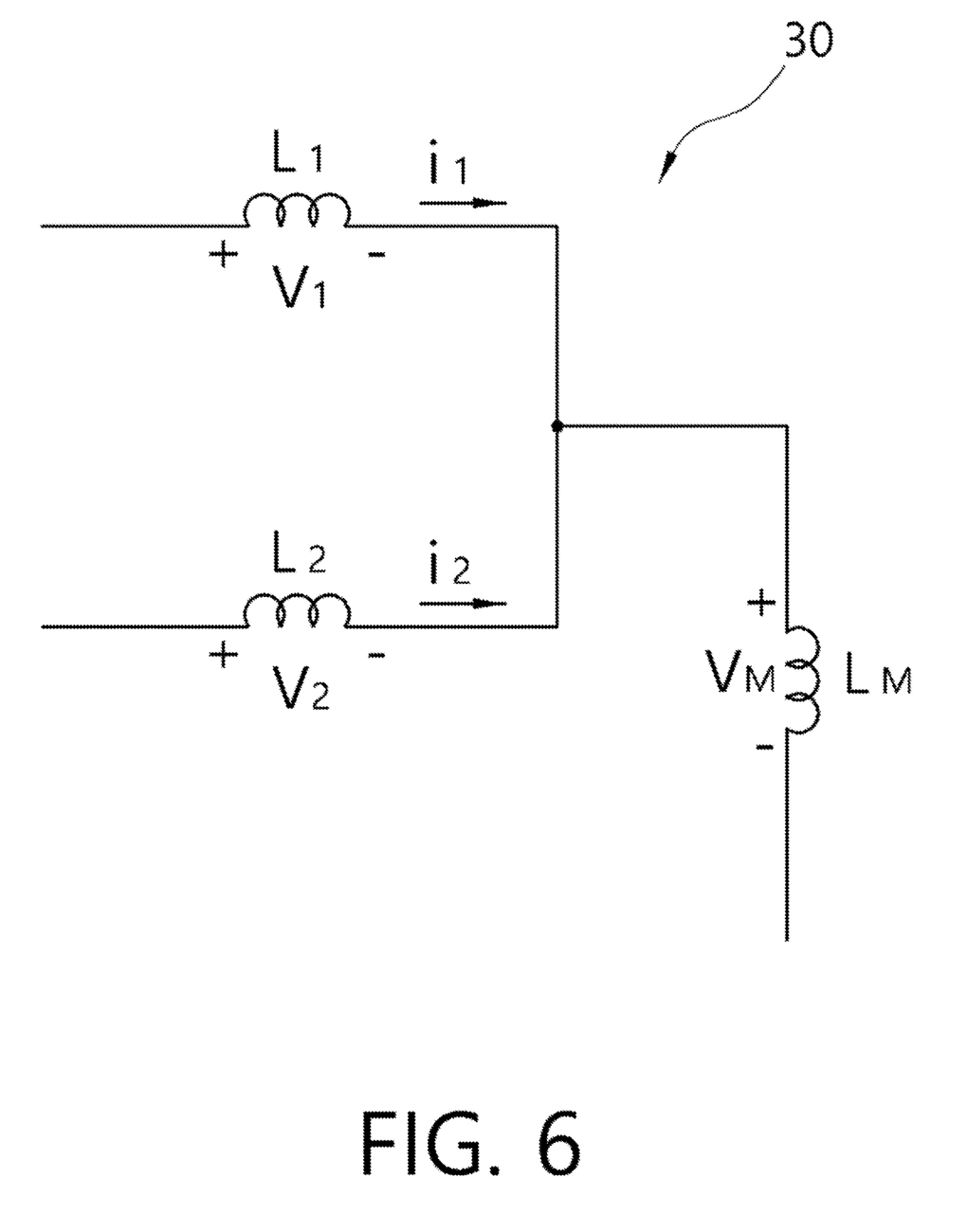
FIG. 6 is an equivalent circuit diagram of a coupled inductor of FIG. 5.

FIG. 6 is an equivalent circuit diagram of a coupled inductor of FIG. 5.

As shown in this figure, the coupled inductor 30 may be equivalent to an inductance $L_1$ of the first inductor 31, an inductance $L_2$ of the second inductor 32, and a mutual inductance $L_M$.

That is, voltages that actually affect a current flowing through the first inductor 31 and the current $i_2$ flowing through the second inductor 32 are $v_i$-$v_M$ and $v_2$-$v_M$.

Referring to (b) of FIG. 5, $v_M$ is a voltage applied by switching of the first switch 11 and the fourth switch 14, and $v_M$ may become 0 when each switch is off, be a predetermined magnitude of 5I in a section 5A in which the first switch 11 is on, and be 5J, the inverse voltage of 5I, in a section 5C in which the fourth switch 14 is on. The magnitude of $v_M$ is a value obtained by modeling, and is not limited to that described in the present disclosure.

Accordingly, as shown in (c) of FIG. 5, voltages $v_1$-$v_M$ and $v_2$-$v_M$ that actually affect the current $i_1$ flowing through the first inductor 31 and the current $i_2$ flowing through the second inductor 32 can be obtained, and accordingly, the current $i_1$ flowing through the first inductor 31 and the current $i_2$ flowing through the second inductor 32 can be determined as shown in (d) of FIG. 5.

Figure 7:
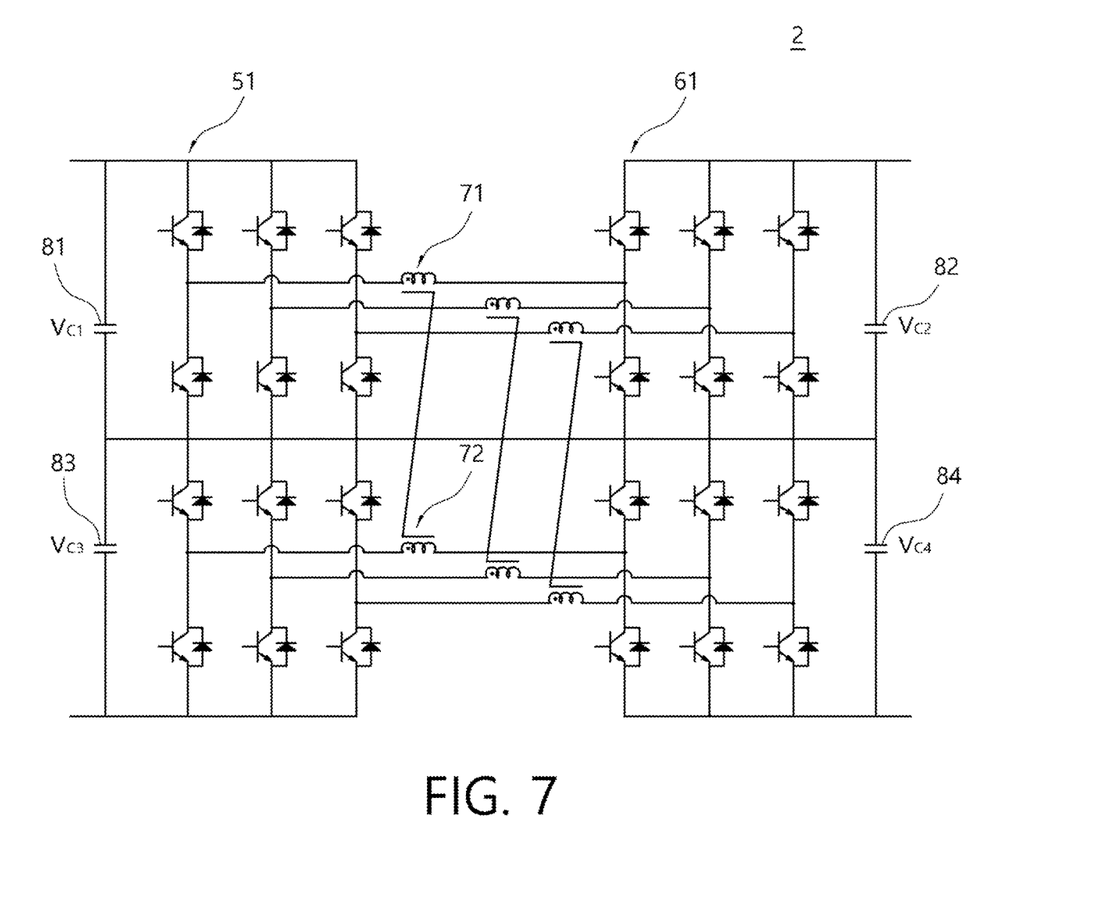
FIG. 7 is an exemplary diagram for explaining a case in which the DC-DC converter according to an exemplary embodiment of the present disclosure is configured in three phases.

FIG. 7 is an exemplary diagram for explaining a case in which the DC-DC converter according to an exemplary embodiment of the present disclosure is configured in three phases.

As shown in this figure, in a three-phase DC-DC converter 2 of one embodiment of the present disclosure, at two legs 51 and 62 including four switches connected in series for each phase, a first inductor 71 may be connected to each node between the upper two switches, a second inductor 72 may be connected to each node between the two lower switches, and the first and second inductors 71 and 72 may be a coupled inductor with the same number of turns.

The series connection of the two switches on the upper side of the first leg 61 may be connected in parallel with the first capacitor 81, and the series connection of the two switches on the lower side may be connected in parallel with the third capacitor 83. In addition, the series connection of the two switches on the upper side of the second leg 62 may be connected in parallel with the second capacitor 82, and the series connection of the two switches on the lower side may be connected in parallel with the fourth capacitor 84.

The above description describes the configuration of one phase, which is the same as that described in FIG. 5, and the configuration is the same for the other two phases, respectively.

However, this is an example, and the DC-DC converter of an embodiment of the present disclosure is not limited to being extended to three phases, and each leg may be configured as an N phase. Even in this case, in each of the plurality of legs, the nodes between the upper two switches and the lower two switches may be equivalent, and the inductor connected to the node between the two upper switches and the inductor connected to the node between the two lower switches may constitute a coupled inductor.

According to such a configuration, it is possible to respond to a wide input/output voltage, and it will be possible to induce a reduction in the volume of the inductor by applying the coupled inductor.

In addition, when the converters as shown in FIG. 5 or 7 are modularized and connected in parallel, pulse width modulation (PWM) synchronization is not required, so product operation may be facilitated.

While the present disclosure has been described in connection with what is presently considered to be practical exemplary embodiments, those skilled in the art may understand that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:
1. A DC-DC converter, comprising:
first to fourth switches connected in series;
fifth to eighth switches connected in series;
ninth to twelfth switches connected in series;
13th to 16th switches connected in series;
17th to 20th switches connected in series;
21st to 24th switches connected in series;
a first capacitor connected in parallel with the series connection of the first and second switches, wherein the first and second switches operate complementary to each other;

a second capacitor connected in parallel with the series connection of the fifth and sixth switches, wherein the fifth and sixth switches operate complementary to each other;

a third capacitor connected in parallel with the series connection of the third and fourths witches, wherein the third and fourth switches operate complementary to each other;

a fourth capacitor connected in parallel with the series connection of the seventh and eighth switches, wherein the seventh and eighth switches operate complementary to each other;

a first inductor electrically connected to a first node between the first and second switches and a second node between the fifth and sixth switches; and a second inductor electrically connected to a third node between the third and fourth switches and a fourth node between the seventh and eighth switches;

wherein a fifth node between the second and the third switches and a sixth node between the sixth and the seventh switches are connected so that the fifth node and the sixth node are electrically equivalent, a third inductor electrically connected to a seventh node between the ninth and tenth switches and an eighth node between the 13th and 14th switches;

a fourth inductor electrically connected to a ninth node between the eleventh and twelfth switches and a tenth node between the 15th and 16th switches;

a fifth inductor electrically connected to an eleventh node between the 17th and 18th switches and a twelfth node between the 21st and 22nd switches; and a sixth inductor electrically connected to a 13th node between the 19th and 20th switches and a 14th node between the 23rd and 24th switches;

wherein the first and second inductors constitute a first coupled inductor, in which a primary coil of the first inductor and a secondary coil of the second inductor are magnetically coupled, and wherein the third and fourth inductors constitute a second coupled inductor, and the fifth and sixth inductors constitute a third coupled inductor.

2. The DC-DC converter of claim 1, wherein the fifth and eighth switches are on, the sixth and seventh switches are off, and an output voltage becomes smaller than an input voltage by on/off operations of the first and fourth switches.

3. The DC-DC converter of claim 1, wherein the first and fourth switches are on, the second and third switches are off, and an output voltage becomes greater than an input voltage by on/off operations of the sixth and seventh switches.

4. The DC-DC converter of claim 1, wherein the fifth node, the sixth node, a 15th node between the tenth and eleventh switches, a 16th node between the 14th and 15th switches, a 17th node between the 18th and 19th switches, and an 18th node between the 22nd and 23rd switches are electrically equivalent.

5. The DC-DC converter of claim 1, wherein the DC-DC converter is configured to be modularized, and at least two or more of the DC-DC converters are configured to be connected in parallel.

* * * * *